US011278825B2

(12) United States Patent
Burns et al.

(10) Patent No.: US 11,278,825 B2
(45) Date of Patent: Mar. 22, 2022

(54) PRESS ASSEMBLY FOR PLANT-BASED MILK

(71) Applicant: ModernMilk Co., Santa Monica, CA (US)

(72) Inventors: Duncan Burns, Santa Monica, CA (US); Jananda Hill, Santa Monica, CA (US)

(73) Assignee: ModernMilk Co., Santa Monica, CA (US)

( * ) Notice: Subject to any disclaimer, the term of this patent is extended or adjusted under 35 U.S.C. 154(b) by 128 days.

(21) Appl. No.: 16/601,290

(22) Filed: Oct. 14, 2019

(65) Prior Publication Data

US 2020/0155977 A1 May 21, 2020

Related U.S. Application Data

(60) Provisional application No. 62/770,574, filed on Nov. 21, 2018.

(51) Int. Cl.
*B01D 25/12* (2006.01)
*A23C 11/10* (2021.01)

(52) U.S. Cl.
CPC .............. *B01D 25/12* (2013.01); *A23C 11/10* (2013.01)

(58) Field of Classification Search
CPC ................................ B01D 25/12; A23C 11/10
USPC ........................................................ 426/489
See application file for complete search history.

(56) References Cited

U.S. PATENT DOCUMENTS

| 5,453,189 | A | * | 9/1995 | Joergensen | ............ | A47G 19/16 |
| | | | | | | 210/238 |
| 9,346,058 | B2 | | 5/2016 | Yamamoto et al. | | |
| 2015/0028140 | A1 | * | 1/2015 | Monforte Duart | ..... | A47J 19/04 |
| | | | | | | 241/69 |
| 2017/0049256 | A1 | | 2/2017 | Razakov | | |
| 2018/0077945 | A1 | | 3/2018 | Hampton et al. | | |

FOREIGN PATENT DOCUMENTS

EP 2814362 B1 6/2017

OTHER PUBLICATIONS

Korean Intellectual Property Office, International Search Report and Written Opinion of the International Searching Authority, dated Jan. 31, 2020, in PCT/US2019/056123, which is an international application which shares the same benefit of priority as this U.S. application.

* cited by examiner

*Primary Examiner* — Brent T O'Hern
(74) *Attorney, Agent, or Firm* — Kolitch Romano LLP

(57) ABSTRACT

A press assembly and a method for producing plant-based milk may include coupling a tubular filter to a receptacle, the tubular filter having an open first end, a porous wall, and a closed second end. Plant-based raw materials are placed into the filter. The raw materials are pressed toward the closed second end of the filter using a standalone plunger having one or more wiper blades conforming to an inner periphery of the tubular filter, such that liquids of the raw materials pass through the porous wall of the tubular filter and into the receptacle. After the pressing operation, residual solids may be easily removed from inside the filter. This may be accomplished by removing a stopper from the bottom end, and expelling the solids by extending the one or more wiper blades through the opening.

21 Claims, 16 Drawing Sheets

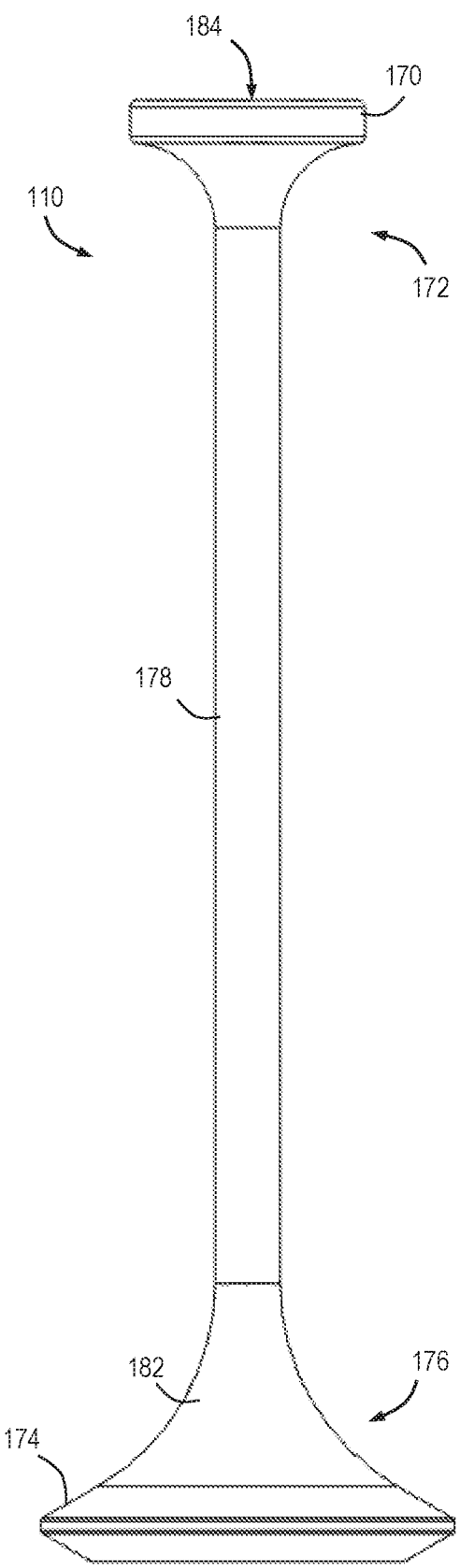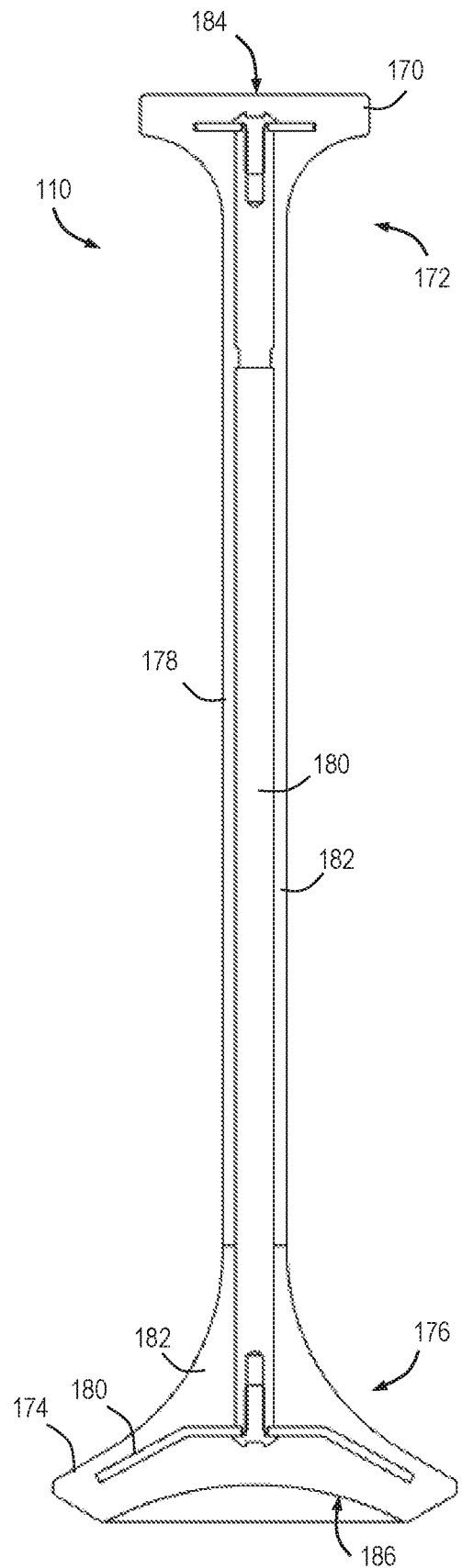

PRESS ASSEMBLY FOR PLANT-BASED MILK

CROSS-REFERENCES

This application claims the benefit under 35 U.S.C. § 119(e) of the priority of U.S. Provisional Patent Application Ser. No. 62/770,574, filed Nov. 21, 2018, the entirety of which is hereby incorporated by reference for all purposes.

FIELD

This disclosure relates to systems and methods for filtering plant-based milks. More specifically, the disclosed embodiments relate to a press for filtering plant-based milk.

INTRODUCTION

Plant-based milks, such as nut milk, hemp milk, and the like, have become popular as beverages and as food ingredients. However, preparation of plant-based milks remains a challenge. For example, nut milks are typically obtained by pureeing nuts until they achieve a substantially fluid consistency, and then straining the pureed matter to separate any remaining pulp or fibers from the fluid (i.e., the milk). According to known systems and methods, the straining step is typically accomplished by pouring the pureed matter through something like a sieve or a cloth bag or sheet. However, these systems may not filter the pureed matter sufficiently, and handling the pureed matter (e.g., pouring the pureed matter into a new container through a sieve) may be messy. Additionally, the sieve, cloth, and/or other straining device may be difficult to clean adequately after use, leading to potential health hazards. A better solution for preparing plant-based milks is needed.

SUMMARY

The present disclosure provides systems, apparatuses, and methods relating to a plant-based milk press.

In some embodiments, a method for producing plant-based milk may include: coupling a tubular filter to a receptacle, the tubular filter including an open first end, a porous wall, and a closed second end having a removable stopper; placing plant-based raw materials into the tubular filter; and using a standalone plunger having one or more wiper blades conforming to an inner periphery of the tubular filter, pressing the raw materials toward the closed second end of the filter, such that liquids of the raw materials pass through the porous wall of the tubular filter and into the receptacle.

In some embodiments, a press assembly for producing plant-based milk may include: a tubular filter having a porous side wall, a closed bottom end having a removable stopper, and a peripheral flange extending from an open top end; a receptacle configured to receive and retain liquids, the receptacle having a top rim defining an open mouth; wherein the tubular filter is configured to hang from the top rim of the receptacle by the peripheral flange, such that the tubular filter extends into an interior of the receptacle; and a standalone plunger having one or more wiper blades extending radially from a shaft, the one or more wiper blades having a peripheral shape conforming to an inner shape of the tubular filter, such that the plunger is configured to press contents of the tubular filter toward the closed bottom end, causing liquids in the contents to pass through the porous side wall.

In some embodiments, a press assembly for producing plant-based milk may include: a tubular filter having a porous side wall, a closed bottom end, and a peripheral flange extending from an open top end; a receptacle configured to receive and retain liquids, the receptacle having a top rim defining an open mouth; a sleeve having an upper rim at a first open end and a lower interface at a second open end, wherein the tubular filter is configured to hang from the upper rim by the peripheral flange, such that the tubular filter extends into the sleeve, and wherein the lower interface is configured to mate with the top rim of the receptacle in a friction fit; and a standalone plunger having one or more wiper blades extending radially from a shaft, the one or more wiper blades having a peripheral shape conforming to an inner shape of the tubular filter, such that the plunger is configured to press contents of the tubular filter toward the closed bottom end, causing liquids in the contents to pass through the porous side wall.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 8 is a side elevation view of an illustrative plunger suitable for use with the milk press assembly of FIG. 1.

FIG. 9 is a sectional view of the plunger of FIG. 8.

DETAILED DESCRIPTION

Figure 1:
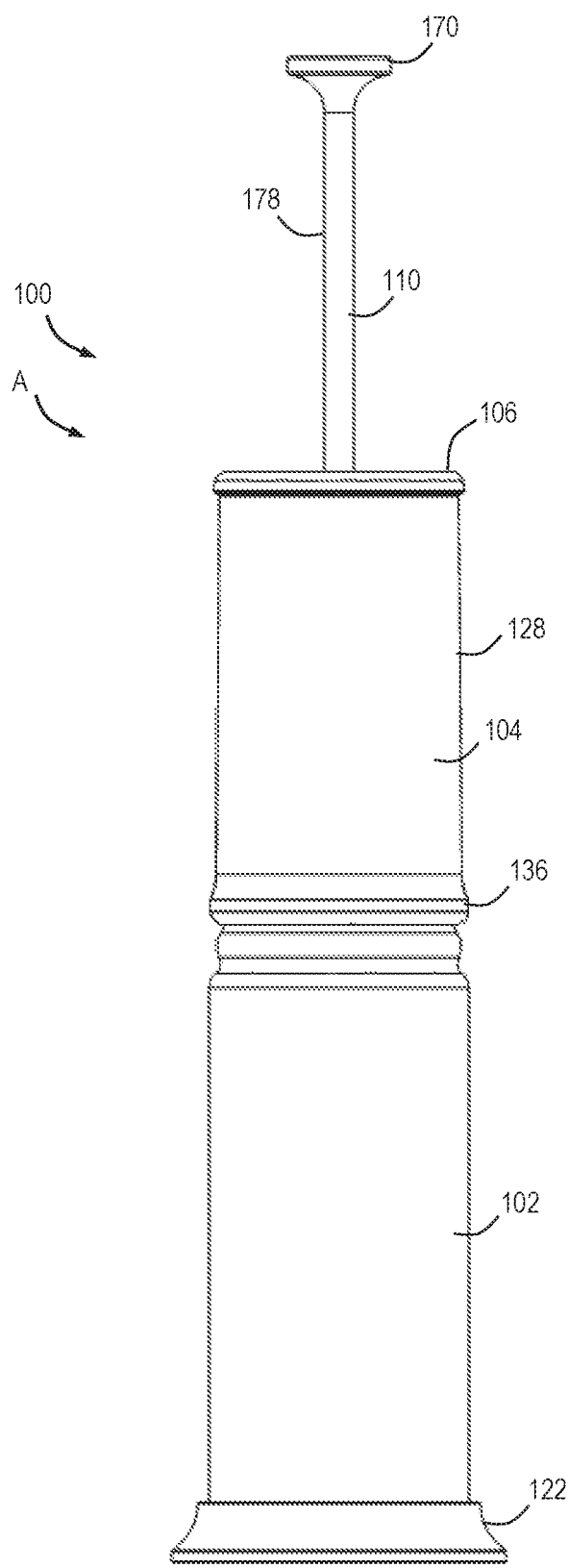
FIG. 1 is a side elevation view of an illustrative milk press assembly in accordance with aspects of the present disclosure, in a first configuration.

Various aspects and examples of a press assembly for plant-based milk production, as well as related methods, are described below and illustrated in the associated drawings. Unless otherwise specified, a press assembly in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Advantages, Features, and Benefits; and (4) Conclusion. The Examples, Components, and Alternatives section is further divided into subsections A and B, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction. In the present disclosure, directional terms should be understood in the context of the press assembly as assembled and oriented during normal use.

"Providing," in the context of a method, may include receiving, obtaining, purchasing, manufacturing, generating, processing, preprocessing, and/or the like, such that the object or material provided is in a state and configuration for other steps to be carried out.

Overview

In general, a press assembly for plant-based milk production according to the present disclosure (also referred to as a press) includes a receptacle, an optional extension sleeve, a filter, and a standalone plunger. The filter has a closed bottom and porous side walls, and is configured to sit above or at least partially within the receptacle. As used herein, the term "raw material" refers to material to be processed using the press assembly, and includes material that is cooked, uncooked, partially cooked, and/or otherwise processed prior to insertion into the filter.

The plunger is configured to compress the raw material within the porous filter, such that plant-based milk is squeezed out of the receptacle through pores or small openings in the filter side walls, into the receptacle. Remaining solid raw material (e.g., pulp) is substantially retained within the filter. In this manner, the filter assembly strains the solid matter from the plant-based milk. Although the term "plant-based milk" is used throughout this disclosure, substances filtered by the press assembly in accordance with the present teachings may also be referred to as a beverage, drink, food, liquid, fluid, juice, etc.

Raw material may include any material suitable for producing plant-based milk when pressed through a filtering device. Typically, raw materials include at least one type of plant product suitable for producing milk (e.g., nuts, seeds, rice, legumes, drupes, grains, soy, oats, coconut, and/or the like), and may further include one or more liquids (e.g., water), protein powders, vitamins, nutrients, flavoring agents such as sugar and/or dates, and/or any other suitable ingredients. In some examples, the plant product and/or additional ingredients are preprocessed (e.g., pureed, chopped, and/or blended) to produce the raw material. In these examples, the raw material may be described as comprising a liquid plant-based milk and some residual solid matter (e.g., pulp, fiber, and/or the like). In these examples, pressing the raw material using a press assembly of the present disclosure filters the residual solid matter from the milk. In some examples, no processing is performed on the raw material before the raw material is pressed in the press assembly. In some examples, some intermediate level of pre-processing may be performed.

Additionally, or alternatively, the raw material may be soaked (e.g., in water and/or any other suitable liquid) and/or cooked in any suitable manner (e.g., baked, roasted, boiled, and/or the like) prior to being pressed in the press assembly.

The filter may be configured to be easily removed (i.e., readily removable) from the receptacle for convenient disposal of the residual solid matter. Making plant-based milk often necessitates removal of residual solid matter, which is made easier using press assemblies of the present disclosure through the ability to remove the solids from the filter's bottom end in an organized fashion. The collected matter is high in fiber, and can be reused, e.g., in cooking or homemade skincare products.

For example, after pulling the filter out of the receptacle, pulp or other solids remaining at the bottom of the filter may be removed by (1) removing a bottom cap of the filter and (2) pressing the plunger completely through the now-open bottom to expel the cake of solids. The plant-based milk produced by pressing the raw material remains in the receptacle, and may be served and/or stored in the receptacle rather than transferred to a new location. The receptacle may include a removable lid. In some examples, the filter and/or plunger are configured to fit within the container (e.g., inside the container under the lid) for convenient storage and/or transport.

In some examples, an extension sleeve is included. The extension sleeve sits atop the receptacle, and supports the filter in a raised position relative to the receptacle. This arrangement largely removes the filter from the interior of the receptacle, providing room within the receptacle to receive the pressed milk.

Examples, Components, and Alternatives

The following sections describe selected aspects of illustrative milk press assemblies, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Press Assembly

As shown in FIGS. 1-16, this section describes an illustrative milk press assembly 100 and related devices. Milk press assembly 100 is an example of the milk presses described in the Overview above.

Figure 2:
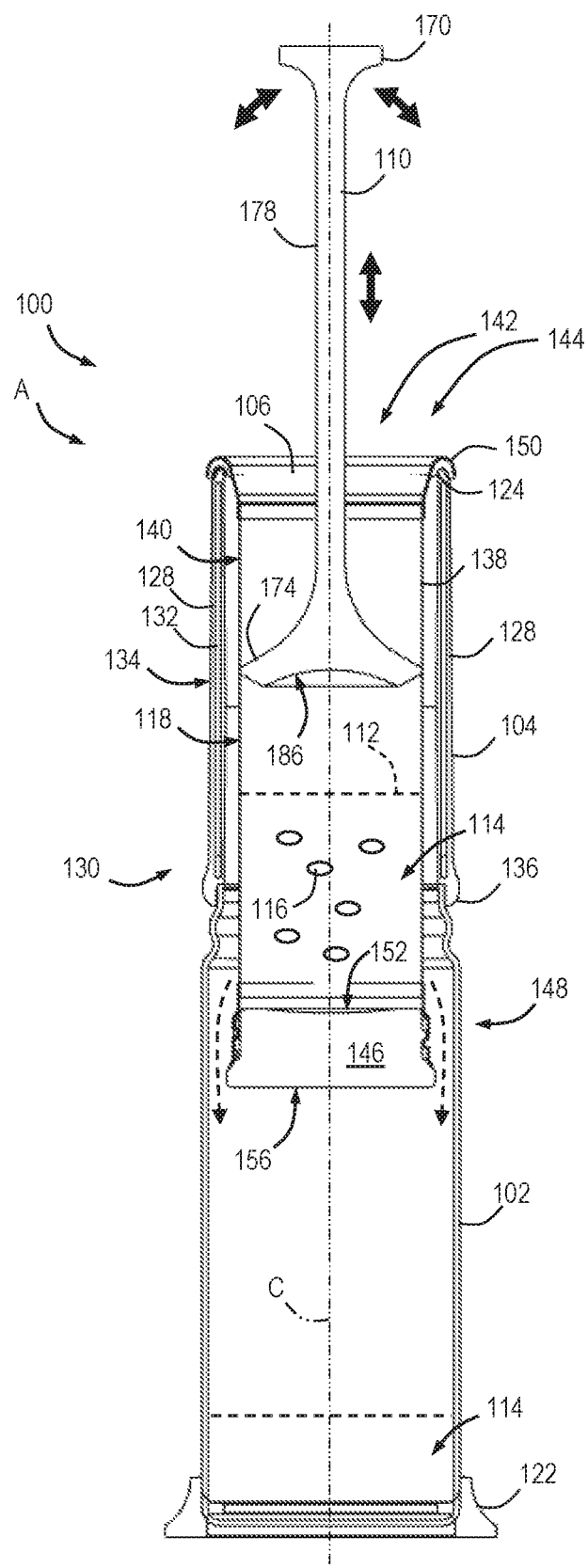
FIG. 2 is a sectional side view of the milk press assembly of FIG. 1.
Figure 3:
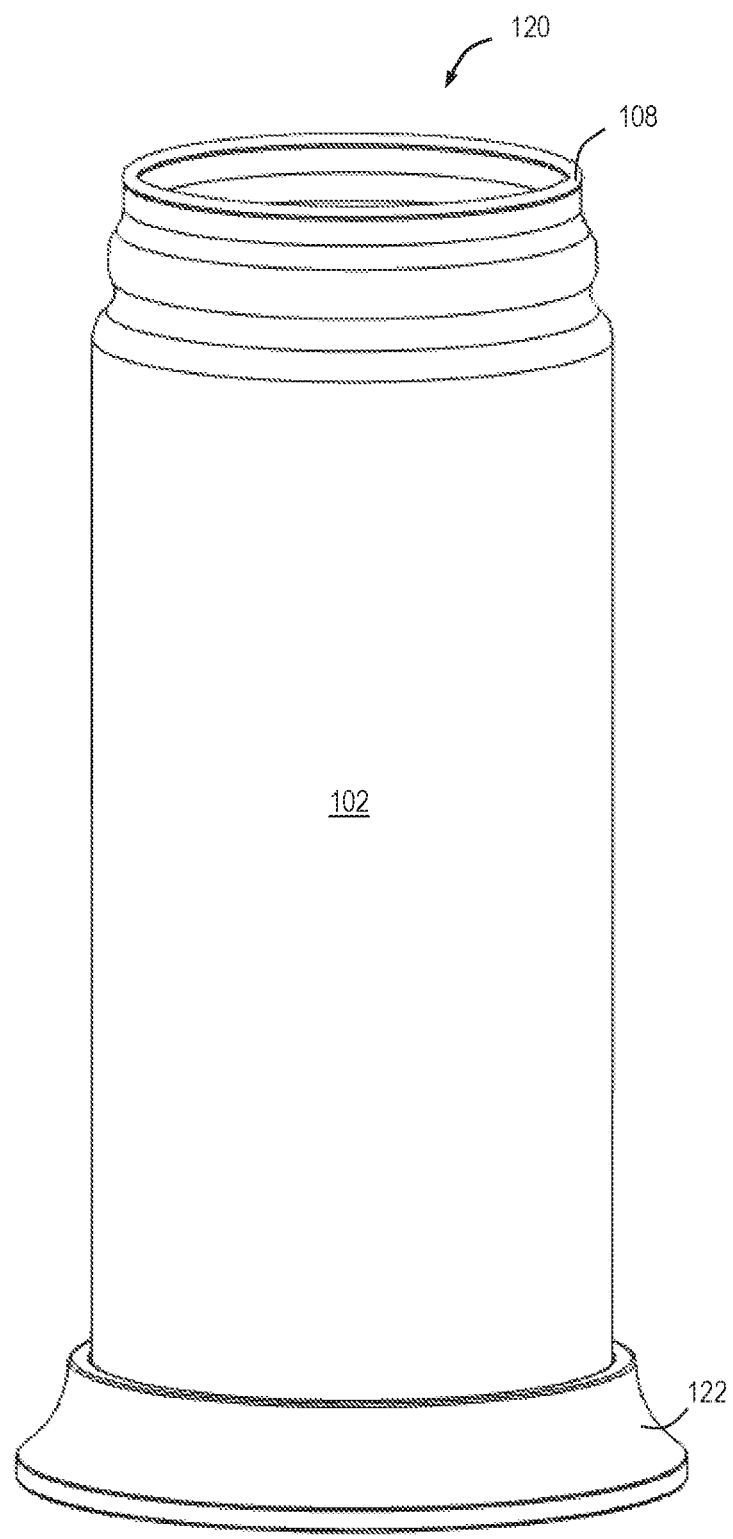
FIG. 3 is an isometric view of a receptacle of the milk press assembly of FIG. 1.

With reference to the side elevation view of FIG. 1 and the sectional view of FIG. 2, milk press assembly 100 includes a milk receptacle 102, an extension sleeve 104 seated atop receptacle 102, and a filter 106 hanging from an upper rim 124 of sleeve 104 down into the sleeve and receptacle. A plunger 110 is included to press, force, squeeze, and/or urge raw materials 112 in filter 106 downward toward the bottom of the filter.

Raw materials 112 may include liquids 114 and solids 116. Pressing the raw materials causes liquids 114 to pass through a porous side wall 118 of filter 106, and into receptacle 102. See FIG. 2.

Receptacle 102 may include any suitable, generally rigid container or jar configured to receive and hold the plant-based milk (i.e., liquids 114). Receptacle 102, in this example, is a cylindrical receptacle having an upper mouth 120 with a top rim 108 running around a periphery thereof. Rim 108 may be described as a circumferential rim in this example, due to the cylindrical shape of receptacle 102. In some examples, a differently-shaped receptacle (e.g., cuboidal) may be utilized. Regardless of the shape of the receptacle, mouth 120 and rim 108 may be circular, as shown in this example, or may be any other suitable shape (e.g., rectangular). Receptacle 102 may comprise any suitable, liquid-proof material configured to hold the plant-based milk and provide sufficient structural support to withstand forces exerted via the plunger and filter during a pressing operation. For example, receptacle 102 may comprise glass, plastic, stainless steel, aluminum, and/or the like. In the example shown in the drawings, receptacle 102 includes a removable stabilizing base 122, which may be coupled to a bottom portion of the receptacle in a friction fit. Accordingly, base 122 is configured to conform to a shape of the bottom portion of the receptacle. See FIG. 3.

Figure 4:
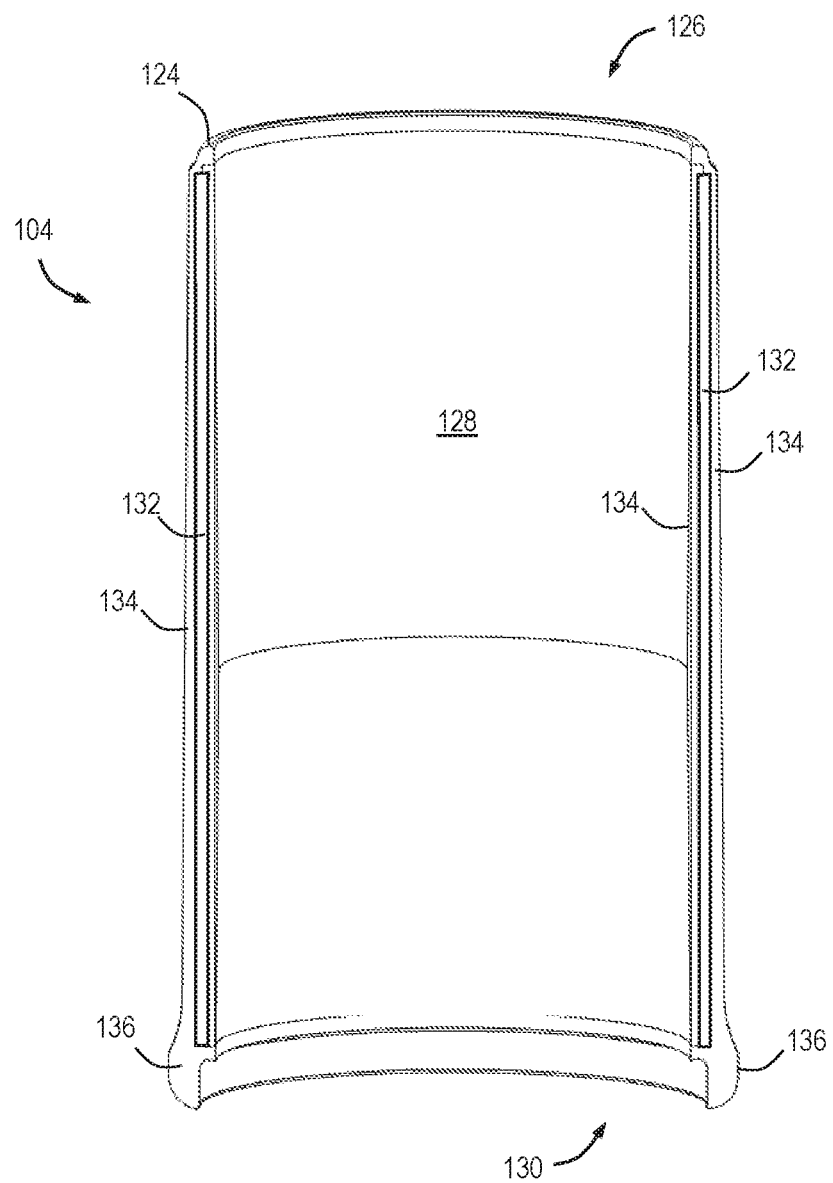
FIG. 4 is an isometric sectional view of an extension sleeve of the milk press assembly of FIG. 1.

In this example, separate extension sleeve 104 (AKA a collar or tube) is included, open on both ends and having upper rim 124 defining a mouth 126, a wall 128 depending from the mouth, and a lower interface 130 configured to mate with top rim 108 of receptacle 102. Filter 106 is configured to hang from upper rim 124 (see below), and sleeve 104 has a height configured to raise filter 106 partially or completely out of an inner volume of the milk receptacle. Upper rim 124 and top rim 108 are substantially similar, in that the filter can be hung from either one. FIG. 4, which is a sectional view of sleeve 104, depicts an inner core 132 and an outer overmolding 134 of the sleeve.

Inner core 132 may include any suitable rigid structure configured to maintain structural integrity of the sleeve during pressing operations. In this example, inner core 132 of sleeve 104 is a rigid cylinder, e.g., comprising stainless steel, aluminum, steel, hard plastic, nylon, and/or the like. Outer overmolding 134 is disposed around the inner core, forming a resilient, liquid-proof covering or shell. Outer overmolding 134 may include any suitable material, such as a rubber or silicone. The overmolding may also provide scratch-preventing and/or sealing surfaces, e.g., at lower interface 130. In this example, a lip 136 is formed around a lower periphery of the overmolding, and is configured to fit snugly around an outboard surface of upper mouth 120 of receptacle 102. In some examples, sleeve 104 may be completely rigid or semirigid, i.e., without a resilient or cushioned exterior. In some examples, sleeve 104 is configured to fit into stabilizing base 122 (e.g., for storage). For example, an inner 137 surface of the base (see FIG. 13) may be configured to receive lip 136 of the sleeve in a friction fit.

Filter 106 includes a tubular portion 138 (e.g., a cylindrical, rectangular, or square tube) having a porous wall 140. Filter 106 has an open mouth 142 at a first end 144, and a removable stopper 146 at a second end 148. First end 144 also includes a peripheral flange 150 configured to hook over top rim 108 of receptacle 102 or upper rim 124 of sleeve 104. In some examples, flange 150 may include a resilient or cushioning ring 151 on an underside thereof. A plurality of transverse channels 153 are formed in a lower surface of ring 151, such that gaps are created when the filter flange rests on the top or upper lip, thereby ensuring air flow and preventing an undesired vacuum within the receptacle. Stopper 146 (also referred to as a bottom cap) may include any suitable porous or non-porous structure configured to be removably received in second end 148 and to retain solids 116 pressed down by plunger 110. In this example, stopper 146 is a non-porous, threaded block having a concave upper surface 152 and a handle 154 formed in a bottom face 156.

Accordingly, in a first configuration A, sleeve 104 is mounted to top rim 108 of receptacle 102, and filter 106 is inserted through mouth 126 of the sleeve. Filter 106 hangs from upper rim 124 of sleeve 104 by flange 150. The filter extends downward through upper mouth 120 of receptacle 102, such that stopper 146 is disposed within the walls of the receptacle, and spaced above the floor. See FIGS. 1-2. Relative heights of the filter, sleeve, and receptacle determine exactly where the bottom of the filter sits when in configuration A. In this example, sleeve 104 has a shorter overall height than filter 106.

Figure 5:
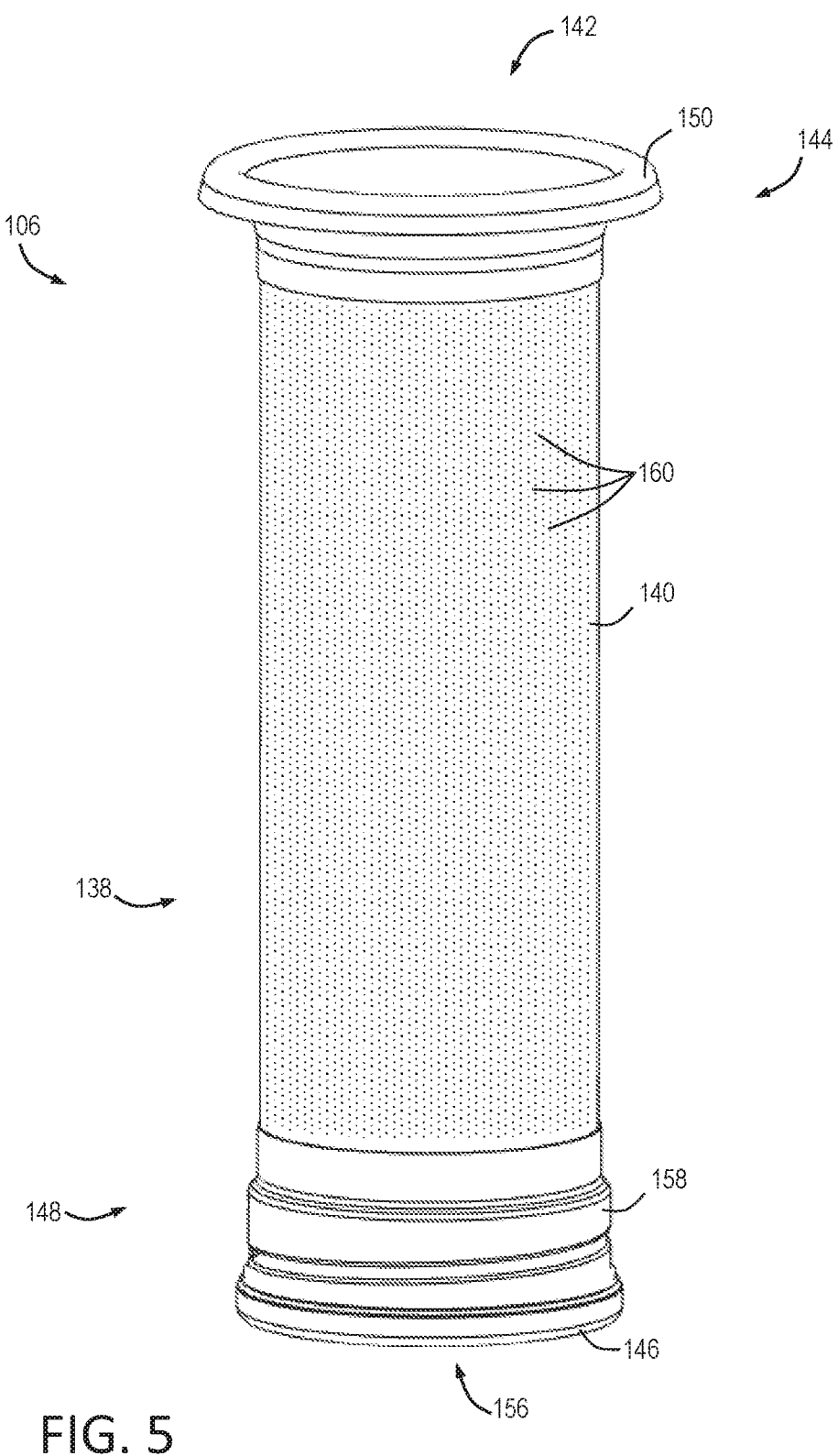
FIG. 5 is an isometric view of a filter of the milk press assembly of FIG. 1.
Figure 6:
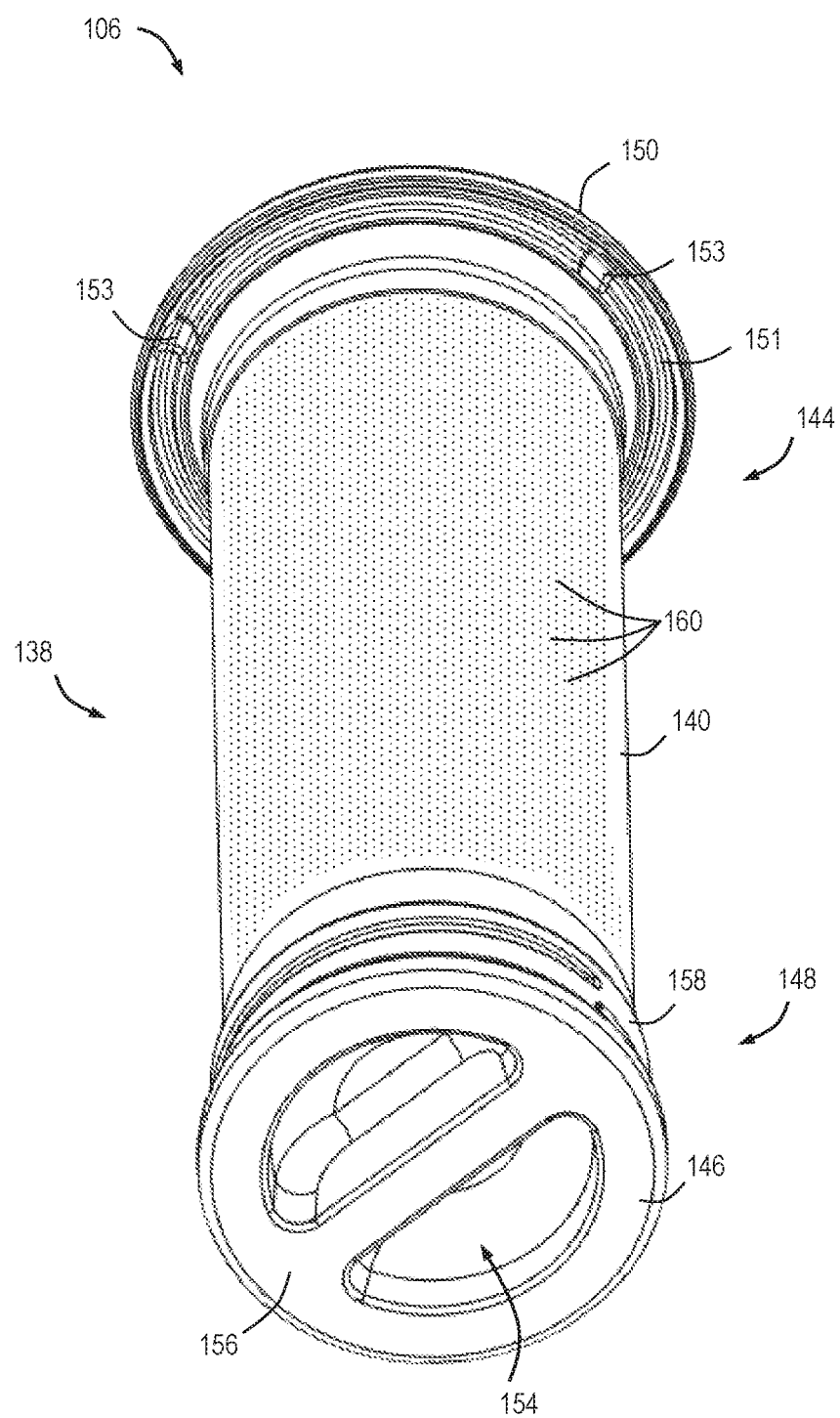
FIG. 6 is an isometric bottom view of the filter of FIG. 5.
Figure 7:
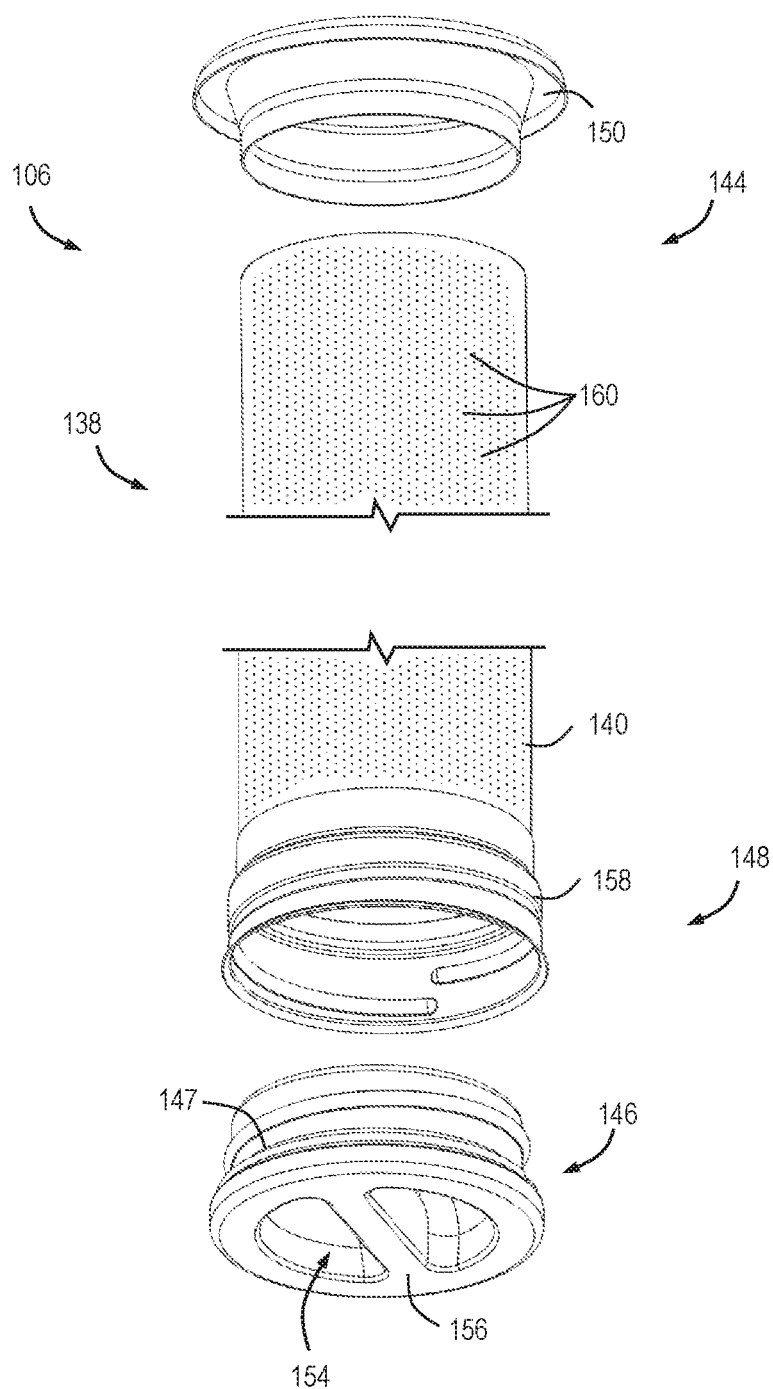
FIG. 7 is an isometric, partially exploded view of the filter of FIG. 5.

Turning to FIGS. 5-7, filter 106 is depicted in various views. As shown in the drawings, an upper end of tubular portion 138 is coupled to peripheral flange 150, and a lower end of tubular portion 138 is coupled to a threaded sleeve 158 configured to threadingly receive stopper 146. Tubular portion 138, peripheral flange 150, and threaded sleeve 158 may be permanently or semipermanently attached to each other, such that these components function as a single piece. In this example, tubular portion 138 comprises stainless steel having a plurality of apertures 160, such that the tube is porous. Apertures 160 may be have any suitable size and density (e.g., holes per square inch) configured to facilitate the pressing operation. For example, apertures 160 may be 50 to 500 microns in diameter. Flange 150 and sleeve 158 may comprise any suitable material, such as stainless steel or rigid plastic.

Figure 14:
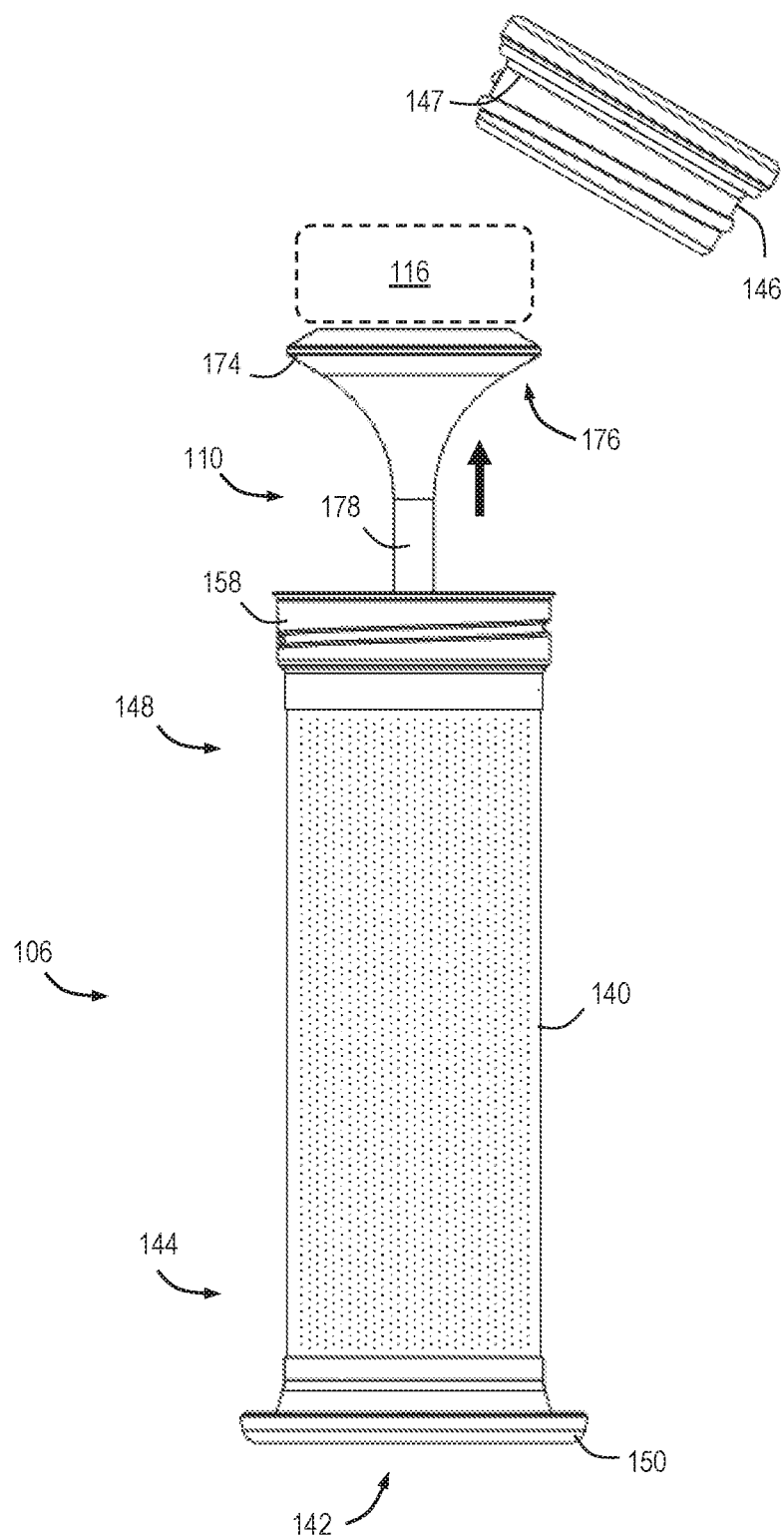
FIG. 14 depicts the filter of FIG. 5 during an illustrative cleaning and solids-removal process.

Although removable stopper 146 is depicted and described as threaded in this example, some examples include a stopper having a bayonet fitting, a keyed fitting, or any other suitable mechanism configured to retain stopper 146 securely in the filter, while also facilitating easy removal. Stopper 146 may comprise any suitable rigid material, such as metal, silicone, plastic, and/or the like. As depicted in FIGS. 7 and 14, stopper 146 may include an integrated gasket portion 147 to facilitate sealing. Stopper 146 creates a selectively closed end to tubular portion 138. In some examples, removable stopper 146 is absent, and tubular portion 138 of filter 106 is permanently close-ended. In such examples, the closed end of tubular portion 138 may be porous, e.g., substantially similar to porous wall 140.

Figures 10, 11:
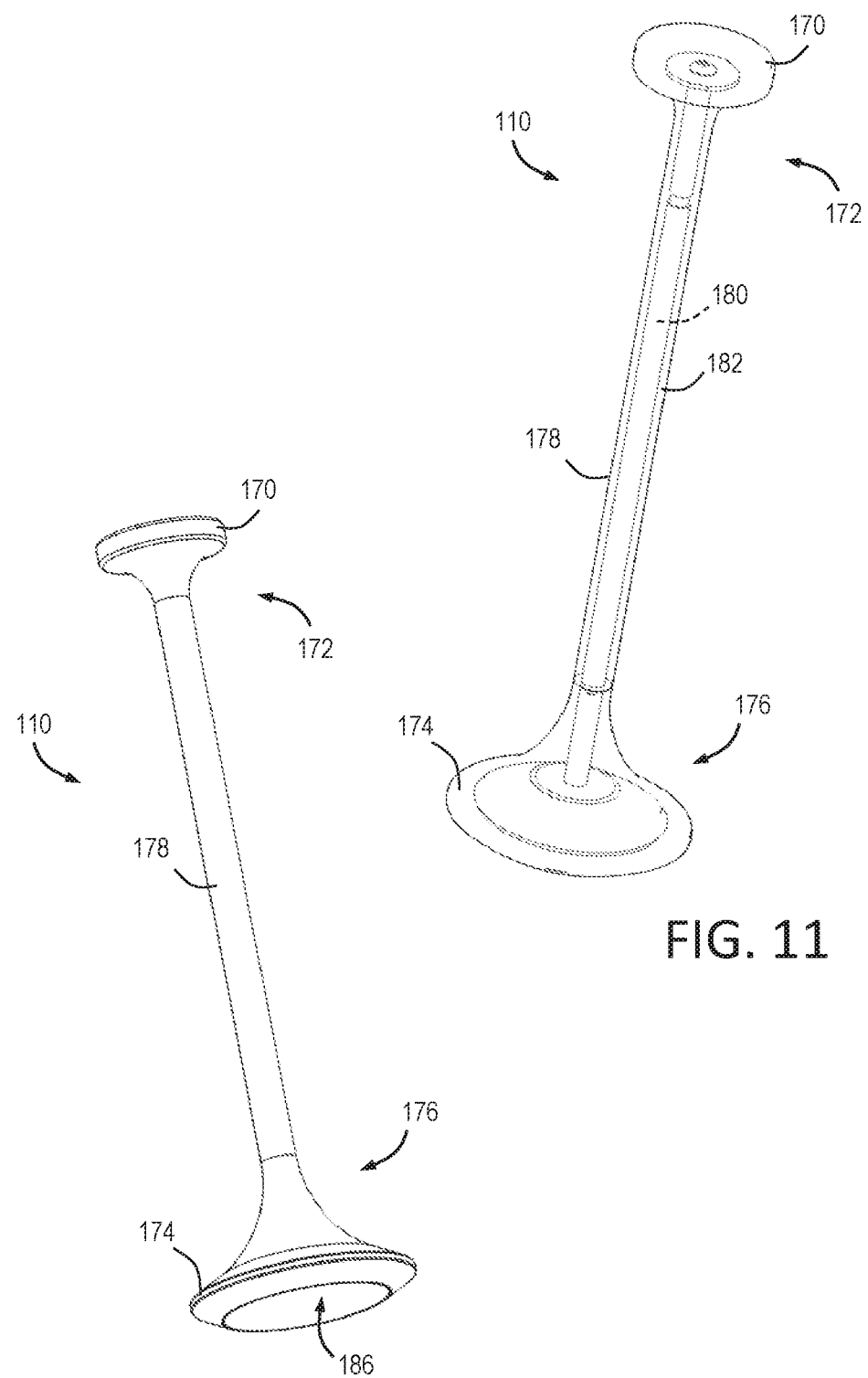
FIG. 10 is an isometric view of the plunger of FIG. 8.
FIG. 11 is a partially transparent view of the plunger of FIG. 8, showing interior structures.

With continuing reference to FIGS. 1 and 2, and turning now to FIGS. 8-10, plunger 110 is depicted in various views. Plunger 110 includes an upper handle or pommel 170 at a first end 172, a lower, trumpet-shaped wiper blade 174 at a second end 176, and a shaft 178 connecting the two. Said another way, shaft 178 has pommel 170 at one end and wiper blade 174 at the other. In some examples, plunger 110 is formed as a single piece. In the example of FIGS. 8-10, a rigid internal skeleton 180 (e.g., comprising steel) supports the plunger, and is covered in a silicone body 182. Skeleton 180 (also referred to as a frame) may include any suitable rigid member(s) configured to provide structural support for the plunger during pressing operations. In this example, skeleton 180 includes an upper flat washer fastened to a vertical rod at one end and a lower frustoconical skirt fastened to the vertical rod at the other end.

Body 182 of plunger 110 may include any suitable material configured to provide a resilient surface for manual operation and for improved wiping characteristics. In this example, body 182 covers the rid and forms the puck-shaped pommel (i.e., with a flat upper surface 184) around the flat washer of the skeleton. At the other end, body 182 flares outward (i.e., radially) from the shaft, forming wiper blade 174. Wiper blade 174 is circular in this example, to conform to an internal wall of the filter. Accordingly, an outer diameter of wiper blade 174 is substantially similar, slightly larger, or slightly smaller than an inner diameter of tubular portion 138 of filter 106.

Wiper blade 174 (and therefore plunger 110) further includes a concave lower surface 186. In combination with concave upper surface 152 of stopper 146, this lower surface forms a generally lozenge-shaped void for receiving solids 116 during the pressing operation. The concavity of lower surface 186 may facilitate the uncovering of more pores 160 during the pressing process, as the lower edge of the wiper pushes solids further downward. As depicted in FIG. 14, the concavity of lower surface 186 may also assist with retention of the cake of solids 116 during the cleaning/solids disposal process. In some examples, the lower surface of plunger 110 may be more concave, less concave, or substantially flat.

During use in pressing operations, plunger 110 can function as a wiper, sealing or nearly sealing the inner wall of the filter, such that the raw material is forced downward and through the holes in porous wall 140. Plunger 110 also acts as a piston for compression of the raw materials. Plunger 110 may also be tilted or tipped to the sides as desired, to intentionally break the seal when moving up and/or down. This tilting capability is useful to dislodge material and/or remove the plunger from the filter. Accordingly, plunger 110 may be moved axially, in line with axis C, and in an off-axis tilting manner, as indicated by the double-ended bold arrows in FIGS. 2 and 13.

As shown in FIG. 2, an axis C runs through a center of the press assembly, such that the press assembly is generally symmetrical with respect to axis C. Plunger 110 is configured to be used in a coaxial manner with respect to axis C. However, plunger 110 is independent and separate from the rest of press assembly 100. Due to the flexibility of the wiper blade 174 and body 182, plunger 110 may be operated (temporarily or otherwise) at an angle relative to axis C without creating substantial gaps between the wiper blade and the inner wall of the filter tube. In other words, the blade edge of the plunger is configured to flex so as to fit or adjust to slight variations in filter tube diameter, and also facilitate a user pressing down at angles slightly off axis and maintain a seal.

Figure 12:
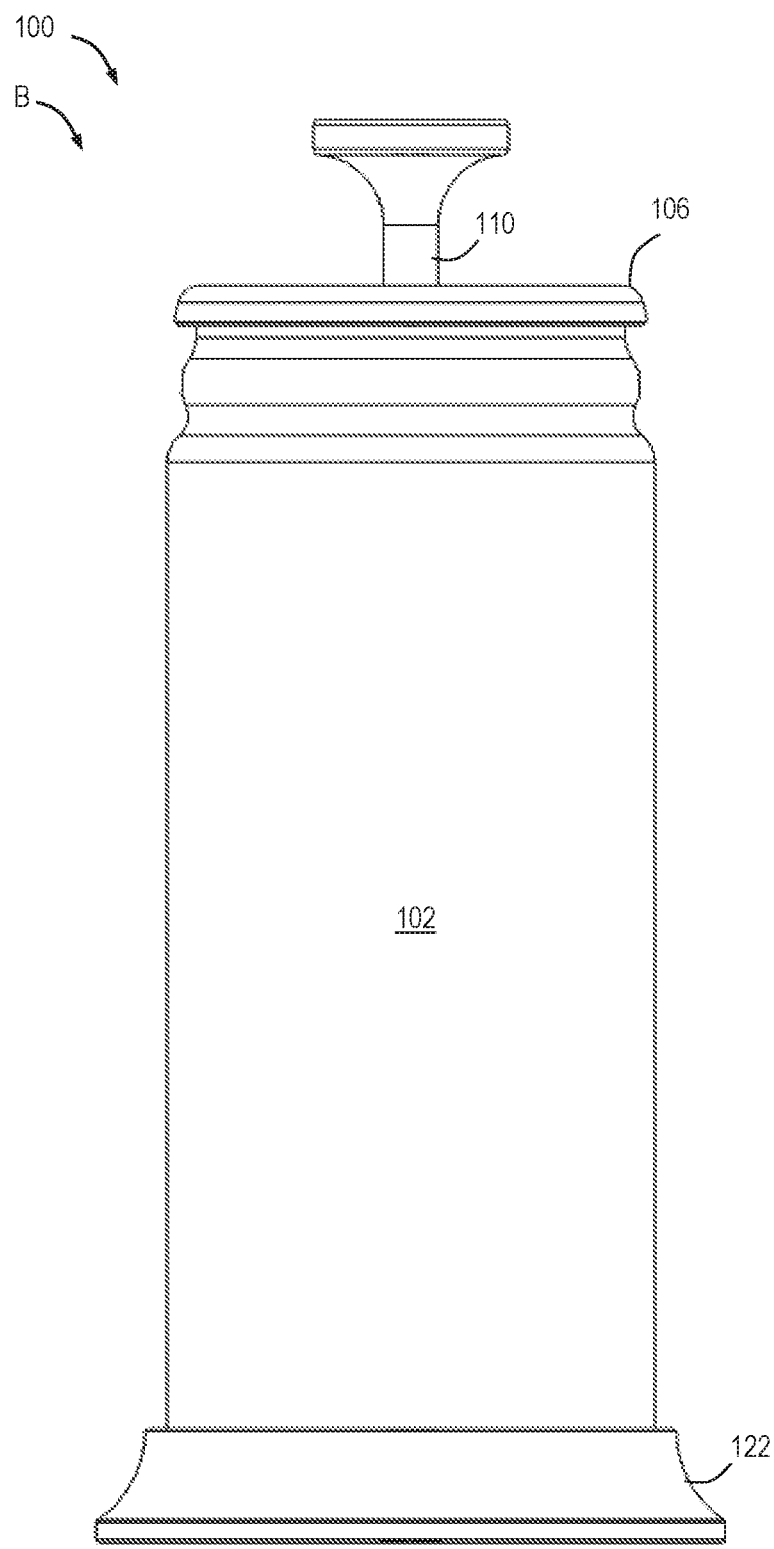
FIG. 12 is a side elevation view of the milk press assembly of FIG. 1, in a second configuration.
Figure 13:
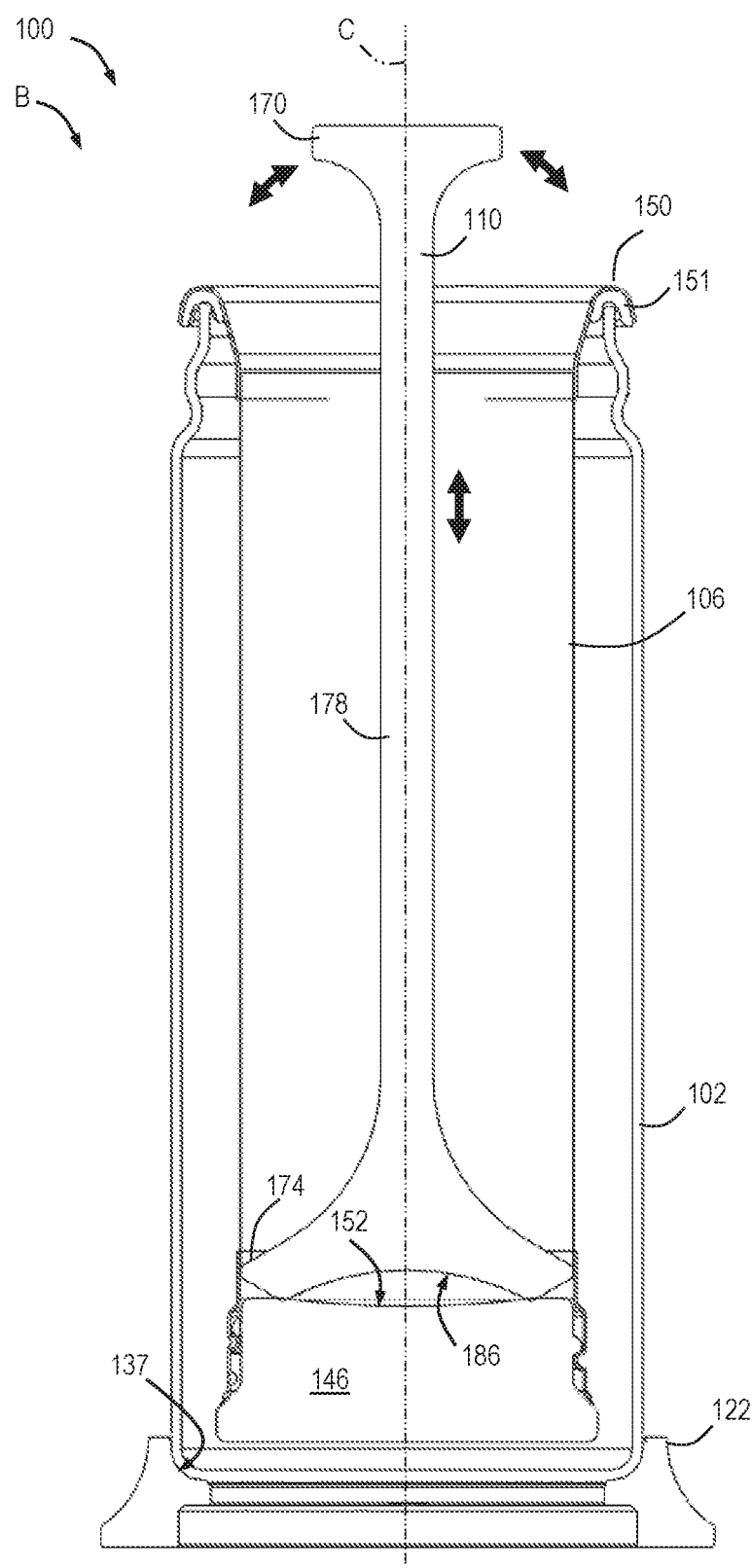
FIG. 13 is a sectional view of the milk press assembly of FIG. 1 in the second configuration.

With reference to FIGS. 12 and 13, another configuration B of press assembly 100 is depicted. In configuration B, extension sleeve 104 is unused or not present. Accordingly, filter 106 hangs by its peripheral flange 150 on top rim 108 of receptacle 102, and extends downward into the receptacle. In this example, receptacle 102 is slightly taller than filter 106, such that stopper 146 is spaced above the floor of the receptacle. In examples where receptacle 102 is shorter than the filter, extension sleeve 104 may be utilized. In some examples, stopper 146 touches and/or rests on the floor of the receptacle.

FIG. 14 depicts filter 106 in an upside-down orientation, with bottom stopper 146 removed from second end 148. Wiper blade 174 is passed upward through the filter tube, thus expelling a cake of solids 116. As described throughout the present disclosure, this cake of residual solids may be further processed, stored, and/or disposed of. Although filter 106 is depicted in a completely vertical orientation, it is to be understood that the filter may be held at any appropriate angle when conducting this cleaning or expelling operation.

Figure 15:
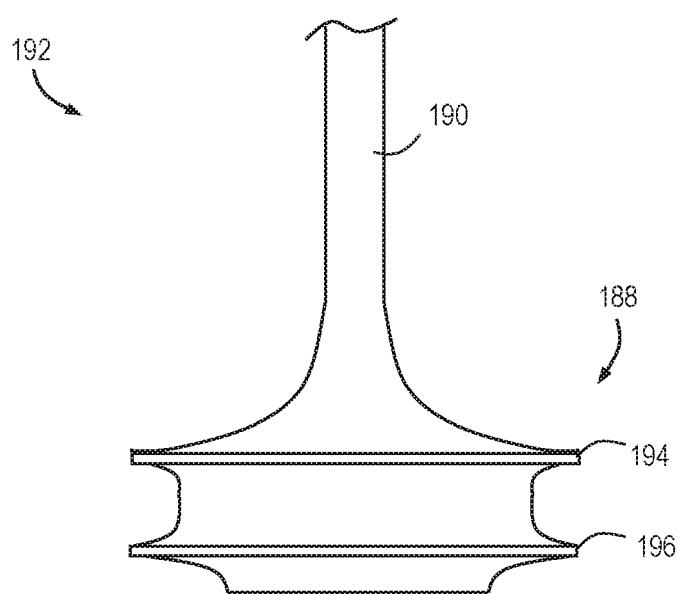
FIG. 15 is a partial view of another illustrative plunger suitable for use with the milk press assembly of FIG. 1.

FIG. 15 depicts an alternative wiper blade portion for plunger 110. In this example, a double wiper blade 188 is coupled to a shaft 190 of a plunger 192. Double wiper blade 188 includes a pair of spaced apart wiper edges 194, 196. This design may facilitate improved sealing, wiping, and/or conforming characteristics during the pressing operation, particularly when plunger 192 is tilted relative to axis C.

Although filter 106 and the wiper blades of plungers 110 and 192 are discussed and depicted as having circular cross sections, any suitable shape may be utilized. For example, filter 106 may have the shape of a triangular prism, rectangular prism, etc., with the corresponding plunger having a wiper of the same or similar shape.

Figure 16:
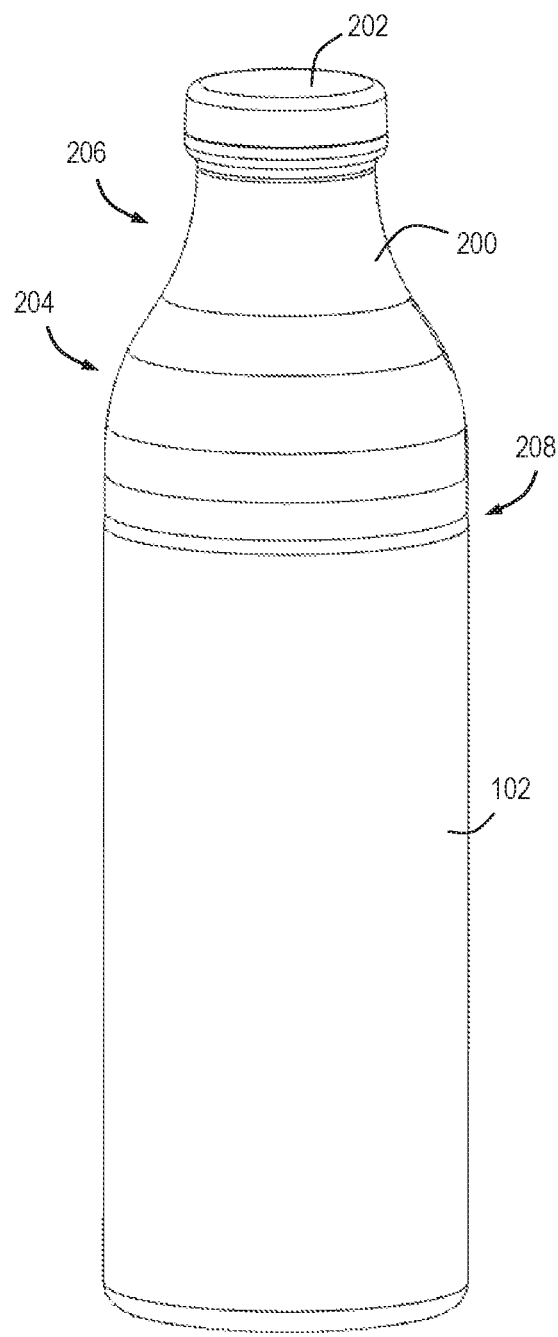
FIG. 16 is an isometric view of a receptacle portion of the milk press assembly of FIG. 1, having an illustrative spout and cap fitted thereto, forming a container.
Figure 17:
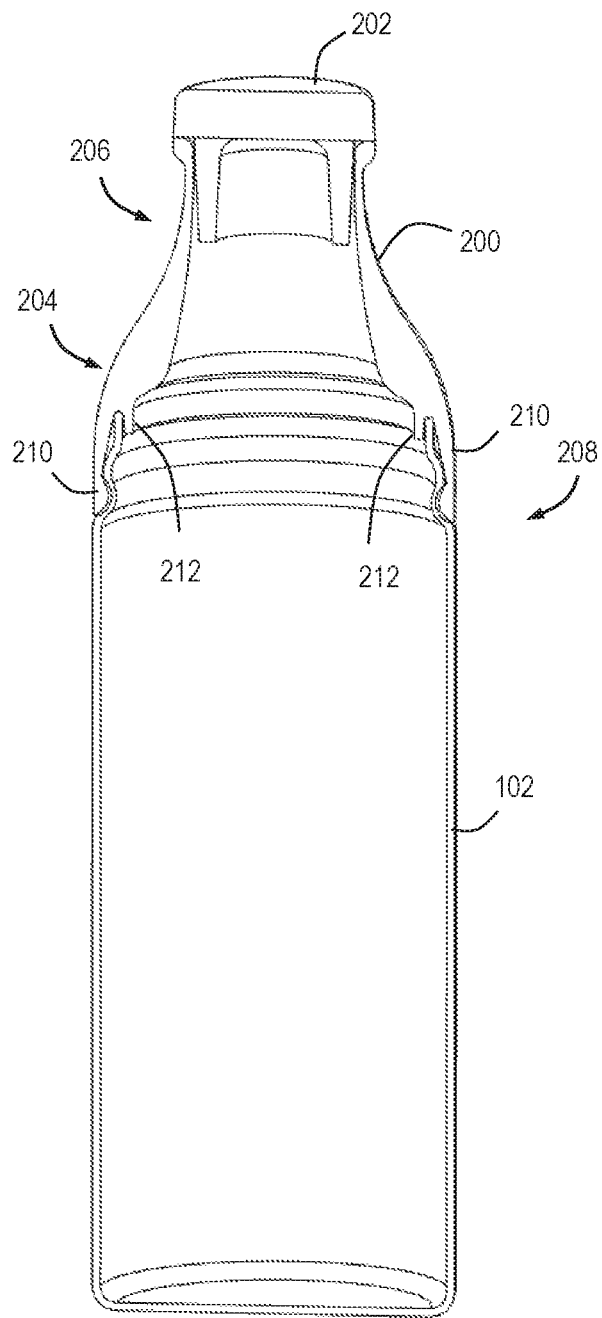
FIG. 17 is a sectional view of the container of FIG. 16.

FIGS. 16 and 17 depict an illustrative configuration of receptacle 102, in which a spout 200 and cap 202 are coupled to top rim 108 of the receptacle. Spout 200 may include any suitably sized or shaped extension configured to facilitate storage and/or enhanced pouring characteristics. In this example, spout 200 is a bottle-shaped extension having a shoulder 204 and a neck 206. Any suitable materials may be utilized; in this example, spout 200 comprises silicone. Cap 202 is friction fit into an upper aperture formed by neck 206. In some examples, cap 202 may be a screw-cap or other suitable closure device. A lower edge 208 of spout 200 is configured to be pressed or snapped on, or otherwise fitted to top rim 108. As depicted in FIG. 16, lower edge 208 has a form-fitting outer lip 210 and an inner circumferential lip 212, forming therebetween a channel into which the rim is seated. In some examples, top rim 108 and lower edge 208 may be threaded, such that attachment may be achieved in a screw-on/screw-off fashion.

Accordingly, a press assembly for producing plant-based milk may be characterized by the following series of alpha-numerically designated paragraphs. Some of the paragraphs below expressly refer to and further limit other paragraphs, providing without limitation examples of suitable combinations.

A0. A press assembly for producing plant-based milk, the assembly comprising:

a tubular filter having a porous side wall, a closed bottom end, and a peripheral flange extending from an open top end;

a receptacle configured to receive and retain liquids, the receptacle having a top rim defining an open mouth;

a sleeve having an upper rim at a first open end and a lower interface at a second open end, wherein the tubular filter is configured to hang from the upper rim by the peripheral flange, such that the tubular filter extends into the sleeve, and wherein the lower interface is configured to mate with the top rim of the receptacle in a friction fit; and a standalone plunger having one or more wiper blades extending radially from a shaft, the one or more wiper blades having a peripheral shape conforming to an inner shape of the tubular filter, such that the plunger is configured to press contents of the tubular filter toward the closed bottom end, causing liquids in the contents to pass through the porous side wall.

A1. The press assembly of A0, wherein the tubular filter is cylindrical.

A2. The press assembly of A0 or A1, wherein the closed bottom end comprises a removable stopper.

A3. The press assembly of A2, wherein the removable stopper comprises a threaded block.

A4. The press assembly of A2, wherein the removable stopper has a concave upper surface.

A5. The press assembly of any one of paragraphs A0 through A4, wherein the plunger has a concave bottom.

A6. The press assembly of any one of paragraphs A0 through A5, wherein the plunger comprises a rigid inner frame covered by a resilient outer body.

A7. The press assembly of any one of paragraphs A0 through A6, wherein the plunger includes only a single one of the wiper blades.

A8. The press assembly of any one of paragraphs A0 through A7, wherein the sleeve has a rigid inner core and a resilient overmolding.

A9. The press assembly of A8, wherein the lower interface of the sleeve comprises a resilient lip configured to extend downward around the top rim of the receptacle.

A10. The press assembly of any one of paragraphs A0 through A8, wherein the sleeve has an overall height shorter than the plunger.

A11. The press assembly of any one of paragraphs A0 through A10, wherein the tubular filter is configured to hang from the top rim of the receptacle by the peripheral flange, such that the tubular filter extends into an interior of the receptacle.

A12. The press assembly of any one of paragraphs A0 through A11, wherein the closed bottom end is porous.

B0. A press assembly for producing plant-based milk, the assembly comprising:

a tubular filter having a porous side wall, a closed bottom end, and a peripheral flange extending from an open top end;

a receptacle configured to receive and retain liquids, the receptacle having a top rim defining an open mouth;

wherein the tubular filter is configured to hang from the top rim of the receptacle by the peripheral flange, such that the tubular filter extends into an interior of the receptacle and the closed bottom end is spaced from a floor of the receptacle; and a standalone plunger having one or more wiper blades extending radially from a shaft, the one or more wiper blades having a peripheral shape conforming to an inner shape of the tubular filter, such that the plunger is configured to press contents of the tubular filter toward the closed bottom end, causing liquids in the contents to pass through the porous side wall.

B1. The press assembly of B0, wherein the tubular filter is cylindrical.

B2. The press assembly of B0 or B1, wherein the closed bottom end comprises a removable stopper.

B3. The press assembly of B2, wherein the removable stopper comprises a threaded block.

B4. The press assembly of B2, wherein the removable stopper has a concave upper surface.

B5. The press assembly of any one of paragraphs B0 through B4, wherein the plunger has a concave bottom.

B6. The press assembly of any one of paragraphs B0 through B5, wherein the plunger comprises a rigid inner frame covered by a resilient outer body.

B7. The press assembly of any one of paragraphs B0 through B6, wherein the plunger includes only a single one of the wiper blades.

B8. The press assembly of any one of paragraphs B0 through B7, wherein the sleeve has a rigid inner core and a resilient overmolding.

B9. The press assembly of any one of paragraphs B0 through B8, wherein the closed bottom end is porous.

B. Illustrative Method of Operation or Use

Figure 18:
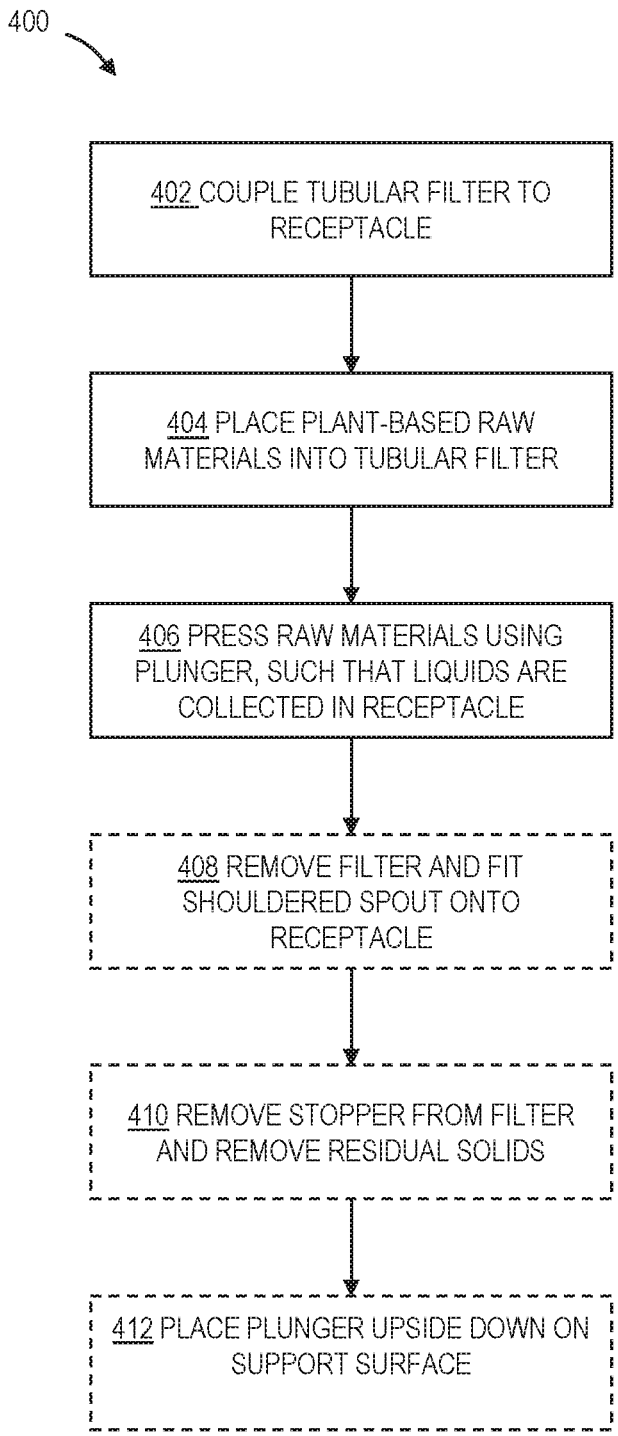
FIG. 18 is a flow chart depicting steps of an illustrative method for producing plant-based milk.

This section describes steps of an illustrative method 400 for producing plant-based milk; see FIG. 18. Aspects of the press assemblies described above may be utilized in the method steps described below. Where appropriate, reference may be made to components and systems that may be used in carrying out each step. These references are for illustration, and are not intended to limit the possible ways of carrying out any particular step of the method.

FIG. 18 is a flowchart illustrating steps performed in an illustrative method, and may not recite the complete process or all steps of the method. Although various steps of method 400 are described below and depicted in FIG. 18, the steps need not necessarily all be performed, and in some cases may be performed simultaneously or in a different order than the order shown.

Step 402 of method 400 includes coupling a tubular filter to a receptacle, where the tubular (e.g., cylindrical) filter has an open first end, a porous wall, and a closed (porous or non-porous) second end. In some examples, the closed second end includes a removable stopper. In some examples, coupling the tubular filter to the receptacle includes hanging a peripheral flange of the tubular filter on an upper rim of the receptacle, such that the tubular filter extends into an interior of the receptacle. In some examples, coupling the tubular filter to the receptacle includes: mounting an extension sleeve on a first upper rim of the receptacle; and hanging a peripheral flange of the tubular filter on a second upper rim of the extension sleeve. In these examples, the tubular filter extends into an interior of the extension sleeve. In some examples, the tubular filter extends further into an interior of the receptacle.

Step 404 of method 400 includes placing plant-based raw materials into the tubular filter. Raw materials may include any material to be processed using the press assembly, and includes plant-based material that is cooked, uncooked, partially cooked, and/or otherwise processed prior to insertion into the filter. For example, the raw materials may include ground almonds and water.

Step 406 of method 400 includes pressing the raw materials toward the closed second end of the filter, using a standalone plunger having one or more wiper blades conforming to an inner periphery of the tubular filter, such that liquids of the raw materials pass through the porous wall of the tubular filter and into the receptacle. In some examples, this step includes tilting the plunger as it is moved up and/or down. The plant-based raw materials may include a plurality of solids, such that the solids are retained within the tubular filter when the plunger is utilized to press the raw materials. In some examples, the solids are trapped between a bottom surface (e.g., a concave bottom surface) of the plunger and an upper surface (e.g., a concave upper surface) of the closed end of the tubular filter, forming a cake of solids. In some examples, the plunger has only a single one of the wiper blades. In some examples, the plunger has a flat upper pommel. In some examples, the pressing of step 406 is omitted, and the raw materials settle over time due to gravity, the liquids passing through the porous wall of the filter.

An optional step 408 may include uncoupling the tubular filter from the receptacle and fitting a shouldered spout onto an upper rim of the receptacle to form a necked container. In some examples, this step may further include closing the spout using a cap fastened to an opening therein. In some examples, the tubular filter may be removed from the receptacle without also fitting the spout and/or using the cap.

An optional step 410 may include uncoupling the tubular filter from the receptacle (if not already performed) and removing the stopper portion of the closed second end. In some examples, the stopper portion is a threaded block, and removing the stopper portion comprises unscrewing the threaded block from the tubular filter. In some examples, this step further includes cleaning the tubular filter by passing the wiper blade of the plunger completely through the tubular filter and out the now-open second end. When the wiper blade of the plunger is passed through the second end, this may function to expel the cake of residual solids from the tubular filter. The solids can then be further utilized or disposed of.

An optional step 412 may include removing the plunger from the filter and placing the plunger upside down, such that the flat upper face of the pommel portion rests on a supporting surface (e.g., a table or counter).

Accordingly, a method for producing plant-based milk may be characterized by the following series of alphanumerically designated paragraphs. Some of the paragraphs below expressly refer to and further limit other paragraphs, providing without limitation examples of suitable combinations.

C0. A method for producing plant-based milk, the method comprising:

coupling a tubular filter having an open first end, a porous wall, and a closed second end having a removable stopper, to a receptacle;

placing plant-based raw materials into the tubular filter;

using a standalone plunger having one or more wiper blades conforming to an inner periphery of the tubular filter, pressing the raw materials toward the closed second end of the filter, such that liquids of the raw materials pass through the porous wall of the tubular filter and into the receptacle.

C1. The method of C0, wherein coupling the tubular filter to the receptacle includes hanging a peripheral flange of the tubular filter on an upper rim of the receptacle, such that the tubular filter extends into an interior of the receptacle.

C2. The method of C0, wherein coupling the tubular filter to the receptacle includes:

mounting an extension sleeve on a first upper rim of the receptacle; and hanging a peripheral flange of the tubular filter on a second upper rim of the extension sleeve;

wherein the tubular filter extends into an interior of the extension sleeve.

C3. The method of C2, wherein the tubular filter extends further into an interior of the receptacle.

C4. The method of any one of paragraphs C0 through C3, wherein the plant-based raw materials comprise the liquids and a plurality of solids, such that the solids are retained within the tubular filter when the plunger is utilized to press the raw materials.

C5. The method of C4, wherein the solids are trapped between a concave bottom surface of the plunger and a concave upper surface of the closed end of the tubular filter, forming a cake of solids.

C6. The method of any one of paragraphs C0 through C5, wherein the tubular filter is cylindrical.

C7. The method of any one of paragraphs C0 through C6, wherein the plunger has only a single one of the wiper blades.

C8. The method of any one of paragraphs C0 through C7, wherein the plunger includes an upper pommel portion having a flat upper face, the method further comprising removing the plunger from the filter and placing the plunger upside down such that the flat upper face of the pommel portion rests on a supporting surface.

C9. The method of any one of paragraphs C0 through C8, further comprising: fitting a shouldered spout onto an upper rim of the receptacle to form a necked container.

C10. The method of C9, further comprising closing the spout using a cap fastened to an opening therein.

C11. The method of any one of paragraphs C0 through C10, further comprising:

uncoupling the tubular filter from the receptacle; and removing the stopper portion of the closed second end.

C12. The method of C11, wherein the stopper portion is a threaded block, and removing the stopper portion comprises unscrewing the threaded block from the tubular filter.

C13. The method of C11, further comprising cleaning the tubular filter by passing the wiper blade of the plunger completely through the tubular filter and out the now-open second end.

C14. The method of C11, wherein the raw materials include solids, the method further comprising expelling a compressed cake of the solids from the second end of the tubular filter using the wiper blade.

Advantages, Features, and Benefits

The different embodiments and examples of the press assembly described herein provide several advantages over known solutions for filtering plant-based milk. For example, illustrative embodiments and examples described herein include a large filtering surface to increase and/or maximize flow of liquid through the filter body for removal of solid matter.

Additionally, and among other benefits, illustrative embodiments and examples described herein allow for pulp and/or other residual matter to be removed from the filter receptacle after pressing.

Additionally, and among other benefits, illustrative embodiments and examples described herein include smooth surfaces having few or no crevices in which debris can be trapped, making the press assembly easy to clean and more hygienic than known devices.

Additionally, and among other benefits, illustrative embodiments and examples described herein allow for plant-based milk to be produced with little or no contact between a user's hands and the raw material, the milk, and/or the portions of the press assembly that contact the raw material and/or milk. Accordingly, illustrative embodiments and examples described herein are more hygienic than known systems and methods, which may require users to touch the food and/or food-contacting surfaces with their hands.

Additionally, and among other benefits, illustrative embodiments and examples described herein allow for milk to be pressed into a container using a filter assembly, and for milk to be stored in the same container after removal of the filter assembly.

Additionally, and among other benefits, illustrative embodiments and examples described herein allow for a press plunger that provides lateral stability and that can be tilted and used off-axis for a better seal, which helps manage foam and avoid liquid overflows to improve the plant milk production process.

Additionally, and among other benefits, illustrative embodiments and examples described herein include a plunger that can be tilted or tipped off-axis to a certain point and still create a seal, but then tipped further to intentionally break the seal so as to pull the plunger back up or work the raw material. This differs from the plungers of known coffee presses, which are confined to remain sealed to the sides and on axis.

Additionally, and among other benefits, illustrative embodiments and examples described herein allow for a press assembly that does not require a collar bushing or other guiding mechanism for the plunger, as is common in coffee presses and the like.

Additionally, and among other benefits, illustrative embodiments and examples described herein allow for a filter assembly and plunger to be stored within a container of the press assembly for ease of storage and shipping.

Additionally, and among other benefits, illustrative embodiments and examples described herein allow pulp to be stored in a removable filter stopper for freezing and/or later use.

Additionally, and among other benefits, illustrative embodiments and examples described herein allow for a press plunger having integrated wiper blade(s), rather than the separate plates and rings common in coffee presses and the like. The integrated wiper blade(s) are relatively easy to clean and less likely to break or malfunction, compared to the separate plates and rings.

Additionally, and among other benefits, illustrative embodiments and examples described herein allow for a press plunger to be positioned upside down on a counter top or other surface, such that those portions of the plunger that typically contact food remain clean. This configuration makes it easier for a user to set the plunger down during use.

Additionally, and among other benefits, illustrative embodiments and examples described herein are adaptable to accommodate various heights of receptacles. For example, if a receptacle is shorter than the tubular filter, then an extension sleeve may be utilized to facilitate proper operation of the press.

Additionally, and among other benefits, illustrative embodiments and examples described herein have the filter suspended inside the extension sleeve from the top rim of the sleeve, such that the user can grip the sleeve to easily remove the sleeve and filter (with plunger inside) to place the combined components over a sink or bowl without needing to touch the messy sides of the filter.

Additionally, and among other benefits, illustrative embodiments and examples described herein preserve the material integrity of the cake of residual solids, and makes it easier to remove. This would otherwise be done by reaching down into the filter and scooping the solids out from the top, which is inconvenient and destroys the compression of the cake.

Additionally, and among other benefits, illustrative embodiments and examples described herein include a receptacle support base that avoids slippage and tipping, and that may absorb forces during the pressing process.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A press assembly for producing plant-based beverages, the assembly comprising:
    a tubular filter having a porous side wall, a closed bottom end having a removable stopper received by a threaded sleeve of the tubular filter, and an open top end;
    a receptacle configured to receive and retain liquids, the receptacle having a top rim defining an open mouth;
    wherein the tubular filter is configured to hang from the top rim of the receptacle, such that the tubular filter extends into an interior of the receptacle; and
    a standalone plunger having one or more wiper blades extending radially from a shaft, the one or more wiper blades having a peripheral shape conforming to an inner shape of the tubular filter, such that the plunger is configured to press contents of the tubular filter toward the closed bottom end, causing liquids in the contents to pass through the porous side wall.

2. The press assembly of claim 1, wherein the tubular filter is cylindrical.

3. The press assembly of claim 1, wherein the removable stopper comprises a threaded block.

4. The press assembly of claim 1, wherein the plunger has a concave bottom.

5. The press assembly of claim 1, wherein the plunger comprises a rigid inner frame covered by a resilient outer body.

6. The press assembly of claim 1, wherein the tubular filter further comprises a peripheral flange extending from the open top end.

7. The press assembly of claim 6, wherein the tubular filter is configured to hang from the top rim of the receptacle by the peripheral flange.

8. The press assembly of claim 1, wherein the tubular filter is further configured to allow passage of the one or more wiper blades of the plunger completely through the bottom end when the stopper is removed.

9. The press assembly of claim 1, wherein the standalone plunger further includes a pommel portion at one end of the shaft, the pommel portion having a flat upper face, such that the plunger is configured to stand upright when the pommel portion is placed on a supporting surface.

10. A press assembly for producing plant-based beverages, the assembly comprising:
   a tubular filter having a porous side wall, a closed bottom end, and an open top end;
   a receptacle configured to receive and retain liquids, the receptacle having a top rim defining an open mouth;
   a sleeve having an upper rim at a first open end and a lower interface at a second open end, wherein the tubular filter is configured to hang from the upper rim, such that the tubular filter extends into the sleeve, and wherein the lower interface is configured to mate with the top rim of the receptacle in a friction fit; and
   a standalone plunger having one or more wiper blades extending radially from a shaft, the one or more wiper blades having a peripheral shape conforming to an inner shape of the tubular filter, such that the plunger is configured to press contents of the tubular filter toward the closed bottom end, causing liquids in the contents to pass through the porous side wall.

11. The press assembly of claim 10, wherein the closed bottom end comprises a removable stopper.

12. The press assembly of claim 10, wherein the plunger has a concave bottom.

13. The press assembly of claim 10, wherein the lower interface of the sleeve comprises a resilient lip configured to extend downward around the top rim of the receptacle.

14. The press assembly of claim 10, wherein the tubular filter is configured to hang from the top rim of the receptacle, such that the tubular filter extends into an interior of the receptacle.

15. The press assembly of claim 10, wherein the tubular filter further comprises a peripheral flange extending from the open top end.

16. The press assembly of claim 15, wherein the tubular filter is configured to hang from the upper rim of the sleeve by the peripheral flange.

17. The press assembly of claim 11, wherein the removable stopper is received by a threaded sleeve of the tubular filter.

18. The press assembly of claim 11, wherein the tubular filter is further configured to allow passage of the one or more wiper blades of the plunger completely through the bottom end when the stopper is removed.

19. The press assembly of claim 10, wherein the standalone plunger further includes a pommel portion at one end of the shaft, the pommel portion having a flat upper face, such that the plunger is configured to stand upright when the pommel portion is placed on a supporting surface.

20. The assembly of claim 11, wherein the removable stopper comprises a bayonet fitting.

21. A press assembly for producing plant-based beverages, the assembly comprising:
   a tubular filter having a porous side wall, a closed bottom end having a removable stopper, and an open top end;
   a receptacle configured to receive and retain liquids, the receptacle having a top rim defining an open mouth;
   wherein the tubular filter is configured to hang from the top rim of the receptacle, such that the tubular filter extends into an interior of the receptacle; and
   a standalone plunger including a pommel portion at a first end of a shaft, and having one or more wiper blades extending radially from a second end of the shaft, the one or more wiper blades having a peripheral shape conforming to an inner shape of the tubular filter, such that the plunger is configured to press contents of the tubular filter toward the closed bottom end, causing liquids in the contents to pass through the porous side wall;
   wherein the pommel portion of the standalone plunger has a flat upper face, such that the plunger is configured to stand upright when the flat upper face of the pommel portion is placed on a supporting surface.

* * * * *